Patented Mar. 1, 1927.

1,619,258

UNITED STATES PATENT OFFICE.

SIDNEY L. HOOVER, OF ST. LOUIS, MISSOURI, ASSIGNOR OF ONE-HALF TO H. FANCOURT MILLER, OF ST. LOUIS, MISSOURI.

INSECTIFUGE.

No Drawing. Application filed March 12, 1926. Serial No. 94,321.

The present invention relates to an insectifuge primarily intended to be used for preventing weevils and other insects from infesting dried foodstuff commodities such as grain cereals, vegetables, fruits, etc.

Another object of my invention is to provide an insectifuge of the kind described that will be injurious to insects without being harmful to humans or animals.

My invention consists in the use of the berries of the "Sapindus marginatus" tree as an insectifuge, the berries being used whole and mixed in proper proportions with the foodstuffs to be preserved, or if desired the berries may be ground to a powder or made into an aqueous solution with water or other suitable liquids, and then intermixed with the foodstuffs to be kept free from vermin.

At certain seasons of the year these berries have a fairly strong odor, but it is to be understood that the efficiency of the insectifuge is not due to a strong odor, because as a matter of fact the noticeable odor will disappear in a few weeks after the berries have been picked and the insectifuge will be found to work as well as ever.

Even though vermin will not be attracted to foodstuffs in which this insectifuge has been used, it has been proven by repeated experiments that it is not injurious in the least degree to humans or animals.

The method of use and the proportions necessary is as follows:—

The insectifuge in any of the states above-described, that is, either whole berries, powdered or in aqueous solution, is intermixed with the foodstuffs that is to be preserved, this intermixture being fairly uniform throughout the mixture, at least uniform as far as possible. As to the quantity of insectifuge necessary, it has been found that six berries have been sufficient to preserve two bushels of wheat against being infested with vermin, or in other words 3 berries have been used to preserve a bushel of wheat. The berries were about three-eighths of an inch in diameter. When used in a powdered state, the powder of three berries should be sufficient to preserve a bushel of foodstuffs, and when used in a liquid state, the amount would be the amount obtained from about three berries, to each bushel of foodstuffs. Of course no harm will be done if an excess amount of insectifuge is used inasmuch as it is harmless, but the amount above-indicated will be sufficient.

It may be mentioned that the insectifuge performs its functions best when the foodstuffs are kept sealed as nearly as possible.

I claim:

1. The method of protecting dried foodstuffs against becoming infested with vermin, consisting in treating them with an insectifuge made of berries of the Sapindus marginatus tree.

2. The method of protecting dried foodstuffs against becoming infested with vermin, consisting in intermixing with said foodstuffs a quantity of berries from the Sapindus marginatus tree.

3. The method of preventing dried foodstuffs from becoming infested with vermin, consisting of uniformly intermixing berries from the Sapindus marginatus tree with said foodstuffs, in the proportions of approximately three berries to one bushel of foodstuffs.

SIDNEY L. HOOVER.